United States Patent [19]

Lussier

[11] Patent Number: 4,843,052

[45] Date of Patent: Jun. 27, 1989

[54] ACID-REACTED METAKAOLIN CATALYST AND CATALYST SUPPORT COMPOSITIONS

[75] Inventor: Roger J. Lussier, Ellicott City, Md.

[73] Assignee: W. R. Grace & Co.-Conn., New York, N.Y.

[21] Appl. No.: 171,496

[22] Filed: Mar. 14, 1988

Related U.S. Application Data

[63] Continuation of Ser. No. 786,711, Oct. 11, 1985, abandoned, which is a continuation of Ser. No. 552,894, Nov. 17, 1983, abandoned, which is a continuation-in-part of Ser. No. 367,648, Apr. 12, 1982, abandoned, which is a continuation-in-part of Ser. No. 380,716, May 21, 1982, abandoned.

[51] Int. Cl.$^4$ .......................... B01J 21/16; B01J 29/06
[52] U.S. Cl. ........................................ 502/68; 502/81
[58] Field of Search ....................... 502/68, 81, 82, 83, 502/84

[56] References Cited

U.S. PATENT DOCUMENTS

| | | | |
|---|---|---|---|
| 1,970,255 | 8/1934 | Taylor | 502/81 |
| 2,495,751 | 1/1950 | Mills et al. | 502/83 |
| 2,974,054 | 3/1961 | Beamesdefer et al. | 502/81 |
| 3,039,973 | 6/1962 | Robinson et al. | 502/83 |
| 3,390,958 | 7/1968 | Howell | 502/68 |
| 3,406,124 | 10/1968 | Eastwood et al. | 502/68 |
| 4,299,730 | 11/1981 | Sommer et al. | 502/81 |
| 4,343,723 | 8/1982 | Rogers et al. | 502/68 |

*Primary Examiner*—Carl F. Dees
*Attorney, Agent, or Firm*—Arthur P. Savage

[57] ABSTRACT

Acid reacted metakaolin useful for the preparation of catalyst and catalyst support compositions. The compositions may include solid inorganic oxides, such as zeolities, clay and/or inorganic gels. The compositions are spray dried and calcined to obtain highly active, dense, attrition resistant fluid cracking catalysts, or used in the preparation of formed catalyst supports.

30 Claims, No Drawings

ACID-REACTED METAKAOLIN CATALYST AND CATALYST SUPPORT COMPOSITIONS

This is a continuation of application Ser. No. 786,711, filed Oct. 11, 1985 which is a continuation of Ser. No. 552,894 filed Nov. 17, 1983 which is a continuation-in-part of my U.S. Applications Serial Nos. 367,648 filed Apr. 12, 1982 and 380,716 filed May 21, 1982 all now abandoned.

The present invention relates to the preparation of catalytic compositions, more particularly to the preparation of dense, hard, particulate hydrocarbon conversion catalysts which comprise or contain acid reacted metakaolin.

Hydrocarbon conversion catalysts such as fluid catalytic cracking catalysts (FCC) are typically manufactured by spray drying aqueous slurries of catalytically active zeolites and matrix forming components such as inorganic oxide gels and/or clays. The resulting catalysts comprise small particles (microspheres) in which the zeolite crystals are dispersed throughout a matrix of relatively catalytically inactive gel or sol binder and clay.

It has been found that clay, particularly kaolin, due to its reasonable price and availability, constitutes a particularly suitable FCC catalyst component. The prior art describes preparation of clay based hydrocarbon conversion catalysts that have been thermally and/or chemically treated to obtain the desired characteristics.

U.S. Pat. No. 2,485,626 describes the preparation of clay based cracking catalyst wherein kaolin clay is heat treated and reacted with acid to remove alumina from the clay structure. The acid reacted clay is washed free of soluble components, and formed into catalyst particles.

U.S. Pat. No. 3,406,124 describes a method for preparing catalysts which contain crystalline aluminosilicate zeolites dispersed in an inorganic oxide matrix. The matrix contains a clay component which is leached with acid to remove a portion of the alumina of the clay structure as soluble aluminum salts. The soluble aluminum salts are precipitated as aluminum hydroxide.

While the prior art describes the preparation of hydrocarbon conversion catalysts which may comprise or contain thermally/chemically treated clays, such as calcined/acid leached kaolin, the refining industry is constantly searching for low-cost catalysts which provide an acceptable degree of activity and selectivity combined with substantial physical strength and attrition resistance.

It is therefore an object of the present invention to provide novel acid reacted metakaolin compositions which may be used in the preparation of improved catalytic compositions.

It is another object to provide hydrocarbon conversion catalysts which are hard, dense and relatively inexpensive to manufacture.

It is yet another object to provide highly active, cost effective FCC catalysts which contain acid reacted metakaolin in combination with inorganic oxide catalyst components such as zeolites, alumina and silica-alumina that may be used in the catalytic cracking of a wide variety of hydrocarbon feedstocks.

It is still a further object to provide inexpensive clay-based FCC catalysts which may be blended with more expensive zeolite containing FCC catalyst and used to process feedstocks that are heavily contaminated with metals, sulfur and/or nitrogen compounds.

These and still further objects of the present invention will become readily apparent to one skilled in the art from the following detailed description and specific examples.

Broadly, my invention contemplates novel acid reacted metakaolins and improved catalytic compositions (including catalysts and catalyst supports) which contain or comprise an acid treated metakaolin that is obtained by heating (calcining) kaolin and reacting the resulting metakaolin with sufficient acid to react with up to about 25 mol precent of the alumina ($Al_2O_3$) present in the kaolin.

More specifically, I have found that dense, hard, attrition resistant catalytic compositions may be prepared from a novel acid treated metakaolin which is obtained by heating (calcining) kaolin to a temperature of about 700° to 910° C., and reacting the resulting metakaolin with sufficient acid to react with less than about 25 mol percent, and preferably from about 5 to 15 percent of the structural alumina present in the metakaolin. The compositions, which optionally include zeolites, alumina, silica-alumina and/or clay, are formed into particles which may be then heat treated (calcined) at a temperature of about 300°–800° C. to obtain hard attrition resistant catalysts or catalyst supports.

The acid reacted metakaolin is particularly characterized by a surface area of about 150 to 500 $m^2/g$, a total pore volume of about 0.15 to 0.50 cc/g, an average pore diameter of 20 to 40 A°, and at least about 90 percent of the surface area in pores below about 50 A° in diameter.

The acid treated metakaolin catalysts described herein have substantially higher activity than the acid leached clays described in the literature. This low cost, high activity acid treated metakaolin provides a significant portion of the total cracking activity of the catalyst. Catalysts with substantial matrix cracking activity are highly desirable for the cracking of high boiling feedstocks, and for the production of high octane gasoline.

While the process is particularly useful for the manufacture of FCC catalysts which may be used to catalytically crack a wide variety of hydrocarbon feedstocks my invention also contemplates the preparation of catalyst supports which are used in the manufacture of hydroprocessing catalysts such as hydrocracking, hydrodesulfurization and hydrodemetallization catalysts.

The reaction metakaolin is obtained by thermally treating kaolin at a temperature of from about 700° to 910° C., and preferably 800° to 900° C., for a period greater than about one minute, and preferably 15 minutes to 8 hours, and more preferably from 2 minutes to 2 hours. The thermal treatment, or calcination step, which may be conducted in the presence of air, converts the raw kaolin into a reactive form which is characterized as metakaolin.

The reactive metakaolin is then reacted with a monobasic acid, such as hydrochloric or nitric acid or an acid salt solution thereof such as aluminum chloride, aluminum nitrate, zirconyl chloride, etc.

The quantity of acid reacted with the metakaolin is sufficient to react with from about 2 to 25 and preferably from 5 to 15 mol percent of the alumina ($Al_2O_3$) present in the metakaolin. The reaction in the case of hydrochloric acid typically proceeds in accordance with the following overall reaction wherein metakaolin has the formula 2 SiO$_2$·Al$_2$O$_3$.

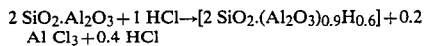

To achieve the desired level of acid treatment, the quantity of acid used is equal to or less than about 1.5 mols of acid per mol of alumina present in the clay. I have found that as little as 0.25 mols of acid per mol of alumina is sufficient to provide the desired acid reacted metakaolin product in less than about 24 hours. The most preferred level of acid is about 0.50 to 1.0 mol of acid per mol alumina in the metakaolin. The desired quantity of acid is combined with sufficient water to provide from about 2.0 to 20 parts by weight acid solution per part by weight metakaolin. The reaction with acid is conducted at a temperature of from about 60° to 100° C. for a period of from about 1 to 24 hours. The resulting acid/metakaolin reaction product contains from about 5 to 50 percent by weight clay solids admixed with a liquid phase which comprises an aqueous solution of a complex acid/aluminum reaction product which has a pH from about 2.0 to 4.0. This acidic aluminum reaction product solution together with the acid leached metakaolin solids comprises the binder or intermediate which is used in the preparation of the catlysts and catalyst supports contemplated herein. The ratio of the acid leached clay solid to complex acidic aluminum species in solution is from about 8/1 to 9.8/1, preferably 9/1 to 9.5/1 parts by weight.

To obtain a cracking catalyst which comprises the acid-metakaolin reaction product described above, the acid-metakaolin reaction mixture is spray dried or otherwise formed into particles of desired shape and size. It is also contemplated that the acid reacted metakaolin reaction product may be reacted with sufficient base to raise the pH of the reaction mixture to a level of about 5.0 to 9.0 in order to precipitate the soluble aluminum component prior to forming. Furthermore, the alumina components may be auto-precipitated by holding the reaction mixture for a period in excess of about 3 hours at a temperature of 60° to 100° C. using high clay solids levels.

To prepare fluid cracking catalysts (FCC) the acid reacted metakaolin is mixed with water to obtain a spray drier feed slurry which contains from about 20 to 60 percent by weight solids. The slurry is then spray dried using conventional techniques to obtain microspheroidal FCC catalyst particles which are then calcined either prior to or during use at a temperature of from about 300° to 800° C. These calcined particles may then be ion exchanged and/or washed to remove undesirable soluble salts. The FCC catalysts of the present invention possess a surface area of about 200 to 600 m$^2$/g, a density of about 0.50 to 0.80 g/cc, and a microactivity of about 40 to 80 volume percent conversion after steaming at 1350° F. with 100 percent steam for 8 hours (ASTM method D3907). Furthermore, the catalysts possess a high degree of attrition resistance as determined by the methods disclosed in U.S. Pat. No. 4,247,420.

The FCC catalysts of this invention are particularly cost effective for the catalytic cracking of residual hydrocracking feedstocks which contain high levels of contaminating metals (Ni & V), sulfur and/or nitrogen. The catalysts may be blended with standard zeolite promoted cracking catalyst of the type described in U.S. Pat. No. 3,867,308 and 3,957,689. It is anticipated that physical blends which contain from about 20 to 80 weight percent zeolite FCC in admixture with the FCC catalysts of this invention will be effective for processing residual feeds that cause rapid deactivation of conventional catalysts by metals contamination.

In the event the acid treated metakaolin contemplated herein is utilized to prepare supports, such as used in the preparation of hydroprocessing catalysts, the acid metakaolin reaction mixture described above is mixed with minor amounts of water and formed into extrudates, pills or granules using conventional forming techniques. It is also contemplated that the acid reacted metakaolin may be reacted with a base to precipitated alumina prior to forming the catalyst supports. The resultant formed particles are then subjected to calcination either prior to or during use at a temperature of from about 300° to 800° C. to obtain hard attrition resistant particles. The resulting calcined particles may then be combined with catalytically active metals such as selected from group VI and group VIII of the Periodic Table to obtain catalysts useful for hydrocracking and hydrodesulfurization, demetallization and so forth. In particular, it is anticipated that from about 1 to 20 weight percent non-noble metals, such as cobalt, molybdenum, chromium and nickel may be impregnated or placed upon the catalyst supports contemplated herein using conventional techniques. In addition it is contemplated that from about 0.1 to 2 weight percent noble metals such as platinum, palladium and rhodium may be combined with the supports to obtain useful, catalytically active products.

As indicated above, my invention also contemplates improved catalytic compositions (including catalysts, catalyst supports and inorganic binders) which contain the novel acid reacted metakaolin as a combination, binder-catalytically active component.

In particular, I have found that dense, hard, attrition resistant catalytic compositions may be prepared by combining particulate catalyst components with the acid reacted metakaolin which serves as both a binder and catalytically active component of the catalyst. The compositions are formed into particles which are then preferably heat treated (calcined) at a temperature of about 300°–800° C. to obtain hard attrition resistant catalysts or catalyst supports.

While the process is particularly useful for the manufacture of zeolite containing FCC catalysts, my invention also contemplates the preparation of catalyst supports. These catalysts and supports comprise inortanic oxide gels and hydrogels such as clay, alumina, silica, and silica-alumina dispersed in or combinedf with a binder which comprises the acid treated metakaolin described above.

To obtain cracking catalysts which contain the acid reacted metakaolin, the acid reacted metakaolin reaction mixture is admixed with the desired quantity of catalytic components and/or gelled with a base and formed into catalyst particles. The added components typically comprise crystalline zeolites such as type X, type Y synthetic faujasite), ultrastable type Y zeolite, ZSM zeolite and/or other desired catalyst components such as clay, alumina and silica-alumina hydrogels. Subsequent to mixing the acid reacted metakaolin binder slurry with the catalyst components, the soluble aluminum components of the binder may be precipitated as alumina by the addition of a base such as ammonium hydroxide, or sodium hydroxide. It is also contemplated that the acid reacted metakaolin reaction product may be gelled without added catalyst ingredients. In the alumina precipitating step, sufficient base is added to raise the pH of the reaction mixture to a level of about 5.0 to 9.0.

Zeolite components may be initially mixed with the acid-metakaolin binder slurry in the sodium form, or the zeolites may be pre-exchanged with hydrogen and/or stabilizing ions such as rare earth ions. Typical exchanged/thermally treated zeolites comprise the calcined rare earth exchanged type X and Y zeolites (CREX and CREY) described in U.S. Pat. No. Re 28,629. In addition, the zeolite component may comprise an ultrastable type zeolite such as described in U.S. Pat. Nos. 3,293,192 and 3,449,070. It is also contemplated that other catalytically active zeolites such as ZSM 5, 11 and mordenite may be utilized alone or as blends with the previously mentioned zeolites.

It is generally found that fluid cracking catalysts (FCC) described herein will comprise from about 5.0 to 20 parts by weight acid meta-kaolin binder (dry basis) and from about 95 to 80 parts by weight solid components such as zeolite, alumina and clays, (including the base gelled acid leached metakaolin described herein). In a typical process of the invention the binder is thoroughly admixed with the solid components to obtain a spray drier feed slurry which contains from about 20 to 60 percent by weight solids. The slurry is then spray dried using conventional techniques to obtain microspheroidal FCC catalyst particles which are then calcined at a temperature of from about 300° to 800° C. These calcined particles may then be ion exchanged and/or washed to remove undesirable soluble salts. Typically, the spray dried product is contacted with solutions of ammonium sulfate and/or rare earth chloride ions.

In the event the acid treated metakaolin binders contemplated herein are utilized to prepare supports, such as used in the preparation of hydroprocessing catalysts, the acid metakaolin reaction mixture described above is gelled and/or admixed with the desired solid components which typically comprise zeolites, clay and inorganic oxide gels such as alumina, silica and silica alumina (including the base gelled acid reacted metakaolin described herein). The mixtures which comprise from about 5 to 40 parts acid treated kaolin binder and 95 to 60 parts inorganic solids may be optionally reacted with a base to precipitate alumina. The mixtures are then formed into catalyst particles having the desired shape and size. Typical forming techniques such as pilling, extruding and granulating may be utilized. The resultant formed particles are then subjected to calcination and a temperature of from about 300° to 800° C, to obtain hard attrition resistant particles. The resulting calcined particles may then be combined with catalytically active metals such as selected from group VI and group VIII of the Periodic Table to obtain catalysts useful for hydrocracking and hydrodesulfurization, demetallization and so forth. In particular, it is found that from about 1 to 20 weight percent non-noble metals, such as cobalt, molybdenum, chromium and nickel may be impregnated or placed upon the catalyst supports contemplated herein using conventional techniques. In addition it is found that from about 0.1 to 2 weight percent noble metals such as platinum, palladium and rhodium may be combined with the supports to obtain useful, catalytically active products.

Having described the basic aspects of the present invention, the following examples are given to illustrate the specific embodiments thereof. The catalytic activity, expressed as volume percent conversion, of the cracking catalysts described in the examples was determined using the procedure of ASTM-D3907.

EXAMPLE 1

This example describes preparation of an acid reacted metakaolin catalytic cracking catalyst of the present invention. 67.5 ml of 37% HCl was diluted to about 600 ml total volume and 200 g of metakaolin, which had been prepared by calcining kaolin about 50 minutes at 850° C. in a rotary calciner, was added. The resulting slurry was refluxed for 8 hours. The product was filtered, washed free of Cl$^-$, dried in a forced draft oven and ground. This sample had a surface area of 284 m$^2$/g, an alumina content of 38.8% and a catalytic microactivity of 40.7 after an 8 hour, 732° C., 100% steam deactivation.

EXAMPLE 2

This example uses the same HCl level and concentration as well as the same metakaolin set forth in Example 1, and demonstrates that a high surface area catalyst is produced when the acid reaction period is extended to 60 hours. 13.5 ml 37.0% HCl was diluted to 120 ml, 40 g of the metakaolin described in Example 1 was added, and the resulting slurry was aged at 107° C. in a sealed teflon bottle for 60 hours. The slurry was then filtered, washed Cl$^-$ free and oven dried at 121° C. The resulting product had a surface area of 436 m$^2$/g, an alumina content of 36.6% and a microactivity of 39.9 after the steam deactivation.

EXAMPLE 3

This example indicates that higher levels of acid than used in Examples 1 and 2 also given a high surface area catalyst. 59.0 ml of 37.0% HCl was diluted to 300 ml, and added 100 g of the same metakaolin as in Example 1. The resulting slurry was refluxed about 8 hours, filtered, washed Cl$^-$ free and oven dried. This sample had a surface area of 277 m$^2$/g, an alumina content of 43.8% and a catalytic activity of 34.8% after the steam deactivation.

EXAMPLE 4

This example and examples 5-7 illustrate that undesirably high levels of HCl reduce the alumina content of the catalyst product and reduce its activity. 202.5 ml 37.0% HCl diluted to 750 ml, and 200 g of the same metakaolin of Example 1 was added. A part of the resulting slurry was removed after one-half hour at reflux, filtered, washed Cl$^-$ free and oven dried. This sample had a surface area of 157 m$^2$/g, an alumina content of 33.3% and an activity of 10.7 after steam deactivation.

EXAMPLE 5

This sample was prepared by the same procedure as Example 4, except that 270 ml 37% HCl was used. The resulting catalyst product had a surface area of 232 m$^2$/g, an alumina content of 23.6% and an activity of 13.4 after the steam deactivation.

EXAMPLE 6

This sample was prepared by the same procedure as Example 4, except that 337.5 ml 37.0% HCl was used. This product had a surface area 337 m$^2$/g, an alumina content of 14.1% and an activity of 7.5% after steam deactivation.

third or fourth samples appear to be optimum concentration levels.

TABLE III

| | Effect of Acid Concentration on Surface Area of Reacted Clay Product[1] | |
|---|---|---|
| Sample No. | Reaction Slurry (Composition) | Surface Area ($m^3/g$) |
| 1 | 33.5 ml 37% HCl diluted to 300 ml + 100 g metakaolin (as per Example 1) | 386 |
| 2 | 33.5 ml 37% HCl diluted to 250 ml + 100 g metakaolin (as per Example 1) | 319 |
| 3 | 33.5 ml 37% HCl diluted to 200 ml + 100 g metakaolin (as per Example 1) | 378 |
| 4 | 33.5 ml 37% HCl diluted to 175 ml + 100 g metakaolin (as per Example 1) | 404 |
| 5 | 33.5 ml 37% HCl diluted to 150 ml + 100 g metakaolin (as per Example 1) | 315 |
| 6 | 33.5 ml 37% HCl diluted to 125 ml + 100 g metakaolin (as per Example 1) | 268 |

[1] All preparations were at 17% of stoichiometric HCl, with 60 hr. age at 100° C. in teflon bottles.

EXAMPLE 7

This sample prepared by the same procedure as Example 4, except that 405 ml 37.0% HCl was used. This product had a surface area of 488 $m^2/g$, and alumina content of 6.18% and an activity of 7.0% after steam deactivation.

Table I below summarizes the results of Examples 1–7.

TABLE I

| | Microactivity of Acid Reacted Metakaolin Cracking Catalyst as Function of Acid Level | | | | |
|---|---|---|---|---|---|
| Example # | % Stoichiometric HCl | Time at Reflux (hrs.) | Surface Area ($m^2/g$) | % $Al_2O_3$ in Leached Clay | Microactivity[2] |
| 1 | 17 | 8 | 284 | 38.8 | 40.7 |
| 2 | 17 | 60 | 436 | 36.6 | 39.9 |
| 3 | 29 | 8 | 277 | 43.8 | 34.8 |
| 4 | 50 | ½ | 157 | 33.3 | 10.7 |
| 5 | 67 | ½ | 232 | 23.6 | 13.4 |
| 6 | 83 | ½ | 337 | 14.1 | 7.5 |
| 7 | 100 | ½ | 488 | 6.18 | 7.0 |

[1] ASTM-D3907 microactivity test after an 8 hour, 732° C., 100% steam deactivation (vol. % conversion).

EXAMPLE 8

This example shows that the temperature used in the calcination of the clay to obtain metakaolin affects the rate of surface area formation. 100 g of a calcined kaolin prepared by heating kaolin clay for about 50 minutes at 732° C. was added to separate solutions of 37.1 ml 37.0% HCl diluted to 330 ml. The resulting mixtures were aged for 16, 44 or 51 hours. The results summarized in Table II indicate that while this metakaolin is slower reacting than the metakaolin (840° C. ) used in Examples 1–7, high surface area products are obtained when long acid-reaction times are used.

TABLE II

| Surface Area of 17% Stoichiometric HCl Reacted Metakaolin (50 min. @ 732° C.) | |
|---|---|
| Time @ 100° C. | Surface Area ($m^2/g$) |
| 16 | 128 |
| 44 | 296 |
| 51 | 303 |

EXAMPLE 9

This example shows the effect of acid solution volume/concentration on surface area development. Using the metakaolin of Example 1 33.5 ml quantities of 37 percent HCl (representing 17 mol % of the acid required to react with the alumina present in the metakaolin) were diluted with water to obtain solutions which ranged from 125 to 300 ml in volume. Table III sets forth results for 6 samples. Although all products have high surface area indicating good catalytic activity, the

EXAMPLE 10

This example shows that nitric acid can be used in the preparation of the products of the present invention. 19.3 ml concentrated $HNO_3$ was diluted to 225 ml, and 75 g metakaolin (calcined 50 minutes at 871° C.) was added. Three samples of the mixture were reacted in separate teflon bottles for 4, 6 and 8 hours at 100° C. The results, set forth in Table IV, show that the high surface area product is formed after about 6 hours (Samples 2 and 3).

TABLE IV

| Dilute $NHO_3$ Reacting of Metakaolin | | |
|---|---|---|
| Sample No. | Hot Age Time (hrs.) | Surface Area ($m^2/g$) |
| 1 | 4 | 118 |
| 2 | 6 | 236 |
| 3 | 8 | 314 |

EXAMPLE 11

This example shows that selected calcination conditions reduce the reaction time required to obtain high surface area products. Separate samples of kaolin were put into a hot furnace at temperatures ranging from 650° to 927° C. for one hour. 50 g samples of each of the above calcined clays were slurried in 150 ml $H_2O$ containing 16.9 ml concentrated HCl. The 50 g samples were divided into 3 separate samples and reacted in teflon bottles for 4, 8 or 16 hours. The results, given in Table V, indicate the most effective calcination temperature is 850° to 875° C. Clays calcined at 927° C. exhibited much lower reactivity.

TABLE V

| Product Surface Area as a Function of Calcination Temperature and Reaction Time | | | | | | | |
|---|---|---|---|---|---|---|---|
| Calcination Temp. (°C.)[1] | 650 | 732 | 788 | 843 | 871 | 899 | 927 |
| Reaction Time, 4 hrs. | 87 | 31 | 28 | 184 | 126 | 148 | 25 |
| Reaction Time, 8 hrs. | 25 | 18 | 25 | 340 | 338 | 219 | 28 |

TABLE V-continued

Product Surface Area as a Function of Calcination Temperature and Reaction Time

| Calcination Temp. (°C.)[1] | 650 | 732 | 788 | 843 | 871 | 899 | 927 |
|---|---|---|---|---|---|---|---|
| Reaction Time, 16 hrs. | 24 | 47 | 36 | 296 | 457 | 220 | 36 |

[1]All kaolin calcined 1 hour at the indicated temperature.

EXAMPLE 12

This example shows that low acid levels can be used to obtain the product of this invention. 225 g of calcined kaolin (calcined either one-half hour at 899° C., 1 hour at 871° C. or 1 hour at 843° C.) was slurried in 675 ml solution containing 19.2 ml concentrated HCl. The resulting slurries were boiled 16 hours under reflux. Each slurry sample was filtered, washed to remove CL⁻ and oven dried. The results, given in Table VI, indicate substantial surface area development even at this relatively low acid level.

TABLE VI

Use of 1/24 Stoichiometric HCl on Various Metakaolins

| Clay Calcination Conditions | Reaction Time (Hrs.) | Surface Area (m²/g) |
|---|---|---|
| ½ hr. @ 899° C. | 8 | 206 |
| ½ hr. @ 899° C. | 12 | 287 |
| ½ hr. @ 899° C. | 14 | 300 |
| ½ hr. @ 899° C. | 16 | 338 |
| 1 hr. @ 843° C. | 8 | 198 |
| 1 hr. @ 843° C. | 12 | 231 |
| 1 hr. @ 843° C. | 14 | 251 |
| 1 hr. @ 843° C. | 16 | 251 |
| 1 hr. @ 871° C. | 8 | 196 |
| 1 hr. @ 871° C. | 10 | 252 |
| 1 hr. @ 871° C. | 12 | 270 |
| 1 hr. @ 871° C. | 14 | 278 |

EXAMPLE 13

This example shows that a salt which can generate H+ via hydrolysis can be used in place of mineral acids. 75 g portions of metakaolin (calcined ½ hr. at 900° C.) were added to 900 ml solutions containing varying amounts of $AlCl_3 \cdot 6H_2O$. The slurries were refluxed, the pH adjusted to 7.0 with 14% NH$_4$OH, filtered, washed Cl⁻ free and oven dried. The results, given in Table VII, clearly show the development of very high surface area materials even at low $AlCl_3 \cdot 6H_2O$ levels.

TABLE VII

Effect of Level of $AlCl_3 \cdot 6H_2O$ on Rate of Surface Area Development

| g AlCl$_3$.6H$_2$O/75 g Metakaolin | Time at Reflux (Hrs.) | Surface Area (m²/g) |
|---|---|---|
| 75.3 | 5½ | 278 |
| 37.7 | 8 | 333 |
| 37.7 | 16 | 418 |
| 25.1 | 8 | 313 |
| 25.1 | 16 | 390 |
| 18.9 | 8 | 305 |
| 18.9 | 16 | 428 |
| 12.6 | 8 | 256 |
| 12.6 | 16 | 410 |

EXAMPLE 14

This example shows that ammoniation of the acid reacted clay slurry just prior to filtration enhances activity. A reacted clay slurry was prepared and reacted as in Example 1 except that after reacting the slurry pH was adjusted to 6.0 with 14% NH$_4$OH prior to filtration. The surface area was 326 m²/g and the activity was 49.2, which is substantially higher than the 40.7 observed for the product obtained in Example 1.

EXAMPLE 15

This example shows that enhanced activity can be obtained by precipitating alumina in the presence of acid reacted metakaolin. 5,400 ml concentrated HCl was diluted to about 48 l with water and 16,000 g metakaolin (calcined 1 hour at 732° C.) was added. The resulting mixture was reacted under reflux for 48 hours, filtered, washed 2 times with 10 gallons hot H$_2$O. This product had a surface area of 283 m²/g. 50 g (dry basis, 104.2 g as is) of this filter cake was dispersed in ½ l H$_2$O containing 26.3 g AlCl$_3 \cdot$ 6H$_2$O. The pH adjusted to 6.0 with 14% NH$_4$OH to precipitate alumina and the product was filtered, washed 2 times with ½ l hot H$_2$O and dried at 120° C. The alumina treated sample had an activity of 48.6 versus 36.1 for the untreated sample.

EXAMPLE 16

This example shows the preparation of a gelled acid treated metakaolin of the present invention. 150 g of kaolin clay calcined ½ hour at 900° C. was added to 1.0 l of solution containing 50.7 ml of 37% HCl. Half the slurry boiled under reflux for 4 hours and the other half was boiled for about 8 hours. Both samples were briefly cooled, the pH adjusted to 6.0 with 14% NH$_4$OH to gel the alumina components, the slurry filtered and washed 2 times with ½ l hot deionized H$_2$O and oven dried. The surface areas of the 4 and 8 hour refluxed samples were 295 and 402 m²/g. The catalytic activity of the 4 and 8 hour refluxed samples were 46.4 and 50.5 respectively following the procedure of ASTM-D3907.

EXAMPLE 17

This example shows that significant enhancement in activity is observed by addition of boehmite to the gelled acid treated metakaolin of the present invention. 200 g kaolin clay calcined ½ hour at 900° C. was added to 2.0 l solution containing 67.9 ml 37% HCl and boiled under reflux for 24 hours. To four separate cooled samples of the above slurry, varying amounts of boehmite were added the pH was adjusted to 7.0 with 14% NH$_4$OH, the slurry filtered and the filter cake washed 2 times with ½ l hot deionized H$_2$O. The samples were dried and the cracking catalytic activity of each sample was determined. The activity data, summarized in Table VIII shows that boehmite addition to the gelled acid treated metakaolin results in significant activity improvement.

TABLE VIII

Effect of Added Boehmite on Gelled Acid Reacted Metakaolin Catalysts

| % Added Boehmite | Vol. % Conversion[1] |
|---|---|
| 0 | 50.0 (typical) |
| 15.0 | 59.9 |
| 17.5 | 60.0 |
| 20.0 | 59.0 |
| 22.5 | 59.3 |

[1]ASTM-D3907 Volume % conversion measured at 499° C., 16 WHSV, 3 C/O after an 8 hour, 732° C., 100% steam treatment.

EXAMPLE 18

Samples of hydrothermally acid treated metakaolin were prepared by adding 25 g kaolin (calcined ½ hour at 900° C.) to 125 ml H$_2$O containing 8.5 ml 37% HCl and heating for the time/temperature indicated in Table IX in teflon lined high pressure reactors. The slurries were cooled, diluted with water to make a stirrable slurry, the pH adjusted to 7.0 with 14% NH$_4$OH, filtered, washed 2 times with ½ l hot H$_2$O and oven dried at 120° C. The activity of the hydrothermally acid treated metakaolin is significantly increased relative to the 100° C. refluxed sample.

TABLE IX

Effect of High Temperature Acid Treatment

| Reaction Temp. (°C.) | Reaction Time (Hrs.) | Surface Area (m$^2$/g[1]) | Activity[2] (Vol. % Cov.) |
|---|---|---|---|
| 100 (Typical) | 4–24 | 400 | 50 (Typical) |
| 140 | 6 | 413 | 57.9 |
| 140 | 88 | 526 | 59.2 |
| 165 | 6 | 392 | 58.0 |

[1]Surface area measured after 1 hour at 593° C. thermal temperature.
[2]ASTM-D3907 volume % conversion measured after an 8 hour, 732° C., 100% steam treatment.

EXAMPLE 19

A sample of kaolin clay having a particle size less than 2.0 microns which possessed the initial chemical composition 51.8 weight percent SiO$_2$, 42.2 percent Al$_2$O$_3$ was calcined for one half hour at 900° C. A 300 g sample of the calcined clay was then added to 3 liters of a solution which contained 102 ml of 37 percent HCl. The resulting slurry was refluxed at a temperature of 100° C. for 4 hours. The reaction mixture was then combined with 500 g of calcined, rare earth exchanged type Y zeolite (CREY) which contained 0.79 percent Na$_2$O, and 2323 g (dry basis) raw kaolin. The slurry was homogenized and subsequently spray dried. The physical properties of the resulting catalyst product are summarized in the Table.

EXAMPLE 20

A 9000 g sample of metakaolin, which was obtained by calcining raw kaolin for one-half hour at 900° C., was admixed with 60 l of an acid solution which contained 3042 ml of 37% HCl. This mixture was then boiled under reflux for seven and one-half hours. The slurry pH was adjusted to about 6.0 by the addition of 30 percent ammonium hydroxide. The gelled reaction mixture was then filtered, washed twice with 10 gal of hot deionized water, and reslurried in approximately 25 gal of hot deionized water and recovered by filtration. 450 g D. B. (2074 g as is) of this filter cake was dispersed in a blender along with a slurry which comprised 500 g of the CREY described in Example 1 and 2175 g (dry basis), 2529 g as is of raw kaolin, and approximately 8,000 g of water. The mixture was homogenized by recirculation through a centrifugal pump and subsequently spray dried. The physical properties of the catalyst obtained in this example are set forth in the Table.

EXAMPLE 21

A 1400 g sample of the metakaolin described in Example 2 was combined with 4.2 l of a solution which contained 472.6 ml of 37% HCl dissolved in water. This mixture was boiled under reflux for 2 hours. The reaction mixture was then combined in the blender with 559.4 g CREY and 2120 g (dry basis) kaolin. The slurry was thoroughly mixed and spray dried to obtain microspheroidal particles. The catalyst particles were then calcined 2 hours at 540° C. This sample had the physical properties described in the Table.

EXAMPLE 22

A 6750 g sample of the metakaolin described in Example 2 was added to 80 l of the solution which contained 2286 ml of 37% HCl. This mixture was then boiled under reflux for 7 hours. 6 l of the resulting slurry was combined with a 2175 g (dry basis) sample of raw kaolin and 434 g (dry basis) CREY. The slurry was then mixed thoroughly, spray dried and calcined 2 hours at 540° C. The physical properties of the catalyst obtained in this example is summarized in the Table.

EXAMPLE 23

This example shows that a portion of the acid leached clay slurry can be used to bind an ammonium hydroxide gelled acid leached clay of the type described in Example 2. 600 g of kaolin was calcined one-half hour at 900° C. was added to 6.0 l solution containing 204 ml 37.0% HCl and boiled under reflux for approximately 4 hours. A blended slurry of 180 g as is CREY (0.79% Na$_2$O) and 2,215 g dry basis (10,889 g as is) washed ammonium hydroxide gelled acid leached clay obtained by the precedure set forth in Example 2 was added. The slurry was thoroughly mixed and spray dried. The properties of this catalyst sample are set forth in the Table.

EXAMPLE 24

A 5,200 g dry basis sample of the washed ammonium hydroxide gelled acid leached metakaolin of Example 2 was slurried in a total of about 30,000 g of water and spray dried. The properties are set forth in the Table.

EXAMPLE 25

450 g of the calcined clay described in Example 1 was added to 4.5 l solution containing 153.0 ml conc. Hcl and boiled 4 hours under reflux. To this slurry 500 g of CREY and 2,529 g (raw) kaolin clay were added, the slurry briefly homogenized and spray dried. This sample, of composition 15 percent acid treated clay, 12.5 percent CREY, 72.5 percent kaolin clay, had the properties indicated in the Table.

TABLE X

| Example # | Density *ABD/**CD | Attrition Resistance Davison Index/ Jersey Index[1] | Microactivity[2] |
|---|---|---|---|
| 19 | 0.72/0.81 | 4/0.6 | — |
| 20 | 0.59/0.81 | 13/0.3 | 73.4 |
| 21 | 0.68/.83 | 13/2.0 | — |
| 22 | 0.70/0.81 | 14/2.1 | — |
| 23 | 0.65/0.86 | 12/0.3 | 58 |
| 24 | 0.62/0.71 | 19/1.6 | 44. |
| 25 | 0.67/.83 | 14/2.2 | 70.0 |

[1]Attrition Resistance measured after calcination for 2 hours at 1000° F. as determined by the method set fourth in U.S. Pat. No. 4,247,420.
[2]Microactivity volume % conversion as determined by use of the test as described by Henderson et al at 900° F., 16 WHSV, 3 c/o after an 8 hour, 1350° F., 100 steam deactivation.
*ABD - Apparent Bulk Density (g/cc)
**CD - Compacted Density (g/cc)

EXAMPLE 26

9.0 kg (dry basis) of kaolin clay was calcined for ½ hour at 900° C. and cooled to room temperature. This was added to 75 l of solution containing 3,056 m 37% HCl and boiled under reflux for 22 hours. The slurry was cooled, the pH adjusted to 6.5 with 30% NH$_4$OH, filtered, washed 3 times with 15 gallons hot water, redispersed in the minimum amount of water to make a pumpable slurry and spray dried.

Pore size distribution data on this sample (after a 2 hour at 538° C. treatment) are summarized in Table XI and FIG. 1. It is noted that the product has greater than 90% of its surface area in less than 50A° pores.

EXAMPLE 27

This example shows the effect of addition of a base to gel the slurry on pore size distribution. 100 g (dry basis) kaolin clay was calcined 1 hour at 843° C., cooled, then added with rapid agitation to 300 ml solution containing 33.8 ml 37% HCl, boiled under reflux for 24 hours and divided in half. One portion was filtered, washed on the filter one time with ½ 1 hot deionized water and oven dried. This sample is referred to as the ungelled partially acid leached metakaolin (PALMK). The second portion was gelled by the addition of 14% NH4OH to pH 7.0, filtered, washed one time with ½ 1 hot deionized water and oven dried overnight at 121° C. This sample is referred to as gelled PALMK.

Pore size distribution on the gelled and ungelled PALMK (Table XII) & FIG. 2) indicate both are very small pore materials, with the NH4OH gelled material having more smaller than 20 A° and greater than 600 A° pores.

EXAMPLE 28

This example shows that hydrothermal treatment of PALMK results in a significant loss in surface area and shift to larger average pore diameters. 50 g calcined kaolin clay (calcined 1 hour at 843° C.) was added with rapid agitation to 150 ml solution containing 16.9 ml 37% HCl and boiled 7 hours under reflux, cooled to room temperature, the pH adjusted to 6.0 with 14% NH4OH, filtered, washed one time with 250 ml hot deionized water and oven dried at 121° C. overnight.

A comparison of the pore structure after a 1 hour at 538° C. treatment and after an 8 hour, 732° C., 100% steam treatment is given in Table XIII and FIG. 3. Clearly the hydrothermal treatment significantly reduced surface area and dramatically increased the average pore diameter.

EXAMPLE 29

This example shows the high cracking activity obtained with PALMK, even with relatively low levels of zeolite promoter. 150 g (as is) of kaolin clay (calcined ½ hour at 900° C.) was slurried in 1.0 1 H2O containing 50.7 ml 37% HCl and boiled under reflux for 7 hours. The slurry was then divided into three equal samples, with the first sample adjusted to pH 7.0 with 14% NH4OH, filtered, washed twice with 250 ml hot water and oven dried at 121° C. The second sample was adjusted to pH 7.0 with 14% NH4OH, a blended slurry of low Na2O CREY added (2.36 g SiO2/Al2O3 basis, 4.5% by weight in the catalyst), the slurry filtered, washed twice with 250 ml hot water and oven dried at 121° C. The third sample was gelled with 14% NH4OH, a blended slurry of 8.82 g low Na2O ultrastable zeolite Y added, filtered, washed twice with 250 ml hot water and oven dried at 121° C. After oven drying the samples were crushed to less than 425 microns in particle size and hydrothermally deactivated for 8 hours, 732° C., 100 steam before testing in the microactivity units.

Results, summarized in Table XIV, indicate PALMK by itself (Sample 1) has a high activity, and even at low levels of zeolite addition approaches the activity of higher CREY zeolite commercial catalysts. Selectivity for the CREY containing sample (Sample 2) versus the commercial catalyst indicates the PALMK & CREY gives
(1) Improved liquid yields (Gasoline & Distillate);
(2) Reduced bottoms yield (338° C.+);
(3) Increased LCO yields; and
(4) Similar conversion/coke ratios.

EXAMPLE 30

This example shows that while the gelled PALMK has acceptable physical properties, these can be significantly improved by addition of alumina sol. A large batch of PALMK was prepared by addition of 6,750 g of clay (calcined ½ hour at 900° C.) to 81 1 of solution containing 2,286 ml 37% HCl and boiling 7½ hours under reflux. After cooling, the slurry was adjusted to pH 7.0 with 30% NH4OH, filtered, washed twice with 10 gallons hot deionized water, reslurried in the minimum water and spray dried.

A second preparation was made by adding 9 kg kaolin clay (calcined ½ hour at 900° C.) to 60 1 of solution containing 3,042 ml 37% HCl and boiled 7 hours under reflux. The slurry was briefly cooled, adjusted to pH 7.0 with 30% NH4OH, filtered and washed 3 times with 12 gallons hot deionized water. 7,500 g dry basis (34,600 g as is) of the above cake was reslurried in the minimum water, the pH adjusted to 5.0 with 10% HCl, 5,632 Chlorhydrol having the composition of about 23.5 wt. % Al2O3, 8.0 wt. % Cl added and the slurry spray dried.

Physical properties on the above materials, summarized in Table V, indicate a significant improvement in ABD and D.I./J.I. by the use of alumina sol.

EXAMPLE 31

This example shows that the acid leached clay slurry can be used as a co-binder to improve attrition resistance. The catalyst without PALMK slurry was prepared by addition of a blended slurry of 375 g SiO2/Al2O3 basis CREY to 1,277 g Chlorhydrol, then adding 2,703 g as is kaolin clay, mixing well and spray drying. The sample with PALMK was prepared by adding 450 g clay (calcined ½ hour at 900° C.) to 3.5 1 solution containing 153 ml 37% HCl and boiling for 4 hours, to this was added the CREY slurry and Chlorhydrol and 2,180 g as is kaolin clay. Physical properties (Table XVI) show the sample containing the acid leached clay co-binder to have significantly reduced D.I./J.I. compared to the catalyst prepared without PALMK binder.

EXAMPLE 32

This example shows that addition of PALMK produces catalysts allowing reduced usage of ultrastable type Y zeolite as disclosed in U.S. Pat. No. 3,449,070 (US-Y) to provide equal activity and good gasoline octane. The PALMK for the catalyst in Table XVI was prepared by adding 9.0 kg of kaolin clay (calcined ½ hour at 1650° F.) to 72 1 of solution containing 3,056 ml 37% HCl and boiling 7 hours under reflux. After cooling, the pH was adjusted to 7.0 with 30% NH4OH, filtered, and washed 3 times with 12 gallons hot deionized water. 2,100 g dry basis (14,736 g as is) of this material was added to a blended slurry of 450 g SiO2/Al2O3 basis ultrastable zeolite Y, the pH adjusted to 5.0 with 10% HCl, 1,915 g Chlorhydrol added and the slurry spray dried. The US-Y sample was prepared using only the alumina sol, US-Y and kaolin clay. Results, summarized in Table XVII, indicate similar activity and gasoline octane were achieved in spite of the greatly reduced US-Y usage.

EXAMPLE 33

Table VIII summarizes pilot unit results comparing silica sol bound catalysts with/without PALMK. The PALMK for this preparation was made by addition of 16 kg calcined (½ hour at 900° C.) kaolin clay to 48 l of solution containing 5.4 l 37% HCl and boiling under reflux for 48 hours, filtering and washing on the filter twice with 15 gallons hot deionized water. Note that this PALMK was not gelled by NH₄OH addition. 2,280 g (dry basis) of this material and 800 g ($SiO_2/Al_2O_3$ basis) ultrastable zeolite Y were blended together in the minimum $H_2O$ and the pH adjusted to 4.0 with 20% $H_2SO_4$. 9,200 g silica sol (about 10% by weight $SiO_2$) was added, the slurry mixed well and spray dried. The non-PALMK containing catlyst was prepared in the same fashion, except that more ultrasttable Y was used and kaolin clay was also added instead of the PALMK. Pilot unit results on these catalysts, summarized in Table XVIII, indicate the PALMK containing catalyst produced a gasoline with improved research and motor octane and equal conversion at ⅓ lower US-Y usage.

TABLE XI

Pore Size Distribution Date on NH₄OH Gelled Partially Acid Leached Metakaolin[1]

| | |
|---|---|
| BET Surface Area | 488 m²/g |
| Total N₂ Pore Volume | 0.3645 cc/g |
| Apparent P.V. more than 600 A° diameter | 0.0219 cc/g |
| Apparent P.V. less than 20 A° diameter | 0.1734 cc/g |
| Average Pore Diameter[2] | 28.06 A° |

(of pores up to 600 A°)
% of Surface Area in Pores:

| | |
|---|---|
| greater than 600 A° | 0.14 |
| 100–600 A° | 0.44 |
| 50–100 A° | 1.48 |
| 20–50 A° | 72.22 |
| less than 20 A° | 25.72 |

[1] After drying 1 hour at 538° C.
[2] Average pore diameter (APD) calculated as follows:

$$APD = \frac{4(\text{total } N_2 \text{ PV-Apparent PV more than 600 A°})}{\text{BET Surface Area}} \times 10,000$$

$$= \frac{4(0.3645 - 0.0219)}{488} \times 10,000$$

$$= 28.06$$

TABLE XII

Effect of Gelation on Pore Structure of Partially Acid Leached Metakaolin[1]

| | Ungelled | NH₄OH Gelled |
|---|---|---|
| BET Surface Area | 385.8 | 428.7 |
| Total N₂ Pore Volume | 0.297 | 0.558 |
| Apparent P.V. more than 600 Å | 0.0605 | 0.2883 |
| Apparent P.V. less than 20 Å | 0.0587 | 0.2605 |
| Average Pore Diameter (of pores up to 600 Å) | 24.5 | 25.2 |
| % of Surface Area in Pores: | | |
| greater than 600 Å | 0.48 | 2.07 |
| 100–600 Å | 0.12 | 3.06 |
| 50–100 Å | 0.00 | 0.00 |
| 20–50 Å | 69.54 | 20.73 |
| less than 20 Å | 29.86 | 74.14 |

[1] After heating 1 hour at 538° C.

TABLE XIII

Effect of Hydrothermal Treatment on Pore Structure of PALMK

| Pretreatment | 1 Hour, 538° C. | 8 Hours, 732° C. 100% Steam |
|---|---|---|
| BET Surface Area | 296 | 103 |
| Nitrogen Pore Volume | 0.354 | 0.318 |
| Average Pore Diameter | 36.4 | 89.5 |
| Pore Volume more than 600 Å Pores | 0.0843 | 0.0877 |
| Pore Volume less than 18 Å Pores | 0.0 | 0 |
| % of Surface Area in Pores[1]: | | |
| greater than 600 Å | 0.87 | 2.62 |
| 100–600 Å | 2.52 | 24.03 |
| 50–100 Å | 12.55 | 58.29 |
| 18–50 Å | 78.53 | 25.11 |

[1] May total above or below 100% since surface area calculated from distribution may be different than BET area.

TABLE XIV

Microactivity Data on PALMK With/Without Zeolites

| | PALMK | PALMK + 15% US-Y | PALMK + 4.5% CREY | Commerical SiO₂—Al₂O₃ Gel Bound Catalyst with about 12.5% CREY |
|---|---|---|---|---|
| MA Conditions: | 500°, 32 WHSV, 3 C/O on Good Hope Feed after an 8 hour, 732°, 100% Steam Deactivation. | | | |
| Vol. % Conv. | 56.5 | 69.7 | 71.5 | 72.5 |
| Mod. Conv. (incl. LCO), % | 84.1 | 91.9 | 93.1 | 91.0 |
| H₂, wt. % | 0.125 | 0.105 | 0.084 | 0.061 |
| Tot. C₁ + C₂, wt. % | 2.05 | 2.67 | 2.19 | 2.44 |
| Tot. C₃, % | 6.24 | 7.45 | 6.89 | 8.3 |
| Tot. C₄, % | 10.29 | 11.40 | 10.48 | 9.9 |
| C₅ + Gasco., % | 47.04 | 58.35 | 62.68 | 61.5 |
| LCO, % | 27.56 | 22.18 | 21.62 | 18.5 |
| Total G+D, % | 74.60 | 80.53 | 84.30 | 80.0 |
| 338° C. + Bottoms, % | 15.92 | 8.15 | 6.89 | 9.0 |
| Conv./Coke | 11.5 | 14.5 | 14.9 | 14.8 |

TABLE XV

PALMK with/without Binder

| Composition | 100% Gelled PALMK | 85% Gelled PALMK 15% Al₂O₃ Sol |
|---|---|---|
| Pretreatment | 1 hour at 538° C. | 1 hour at 538° C. |
| Surface Area (m²/g) | 267 | 191 |
| ABD/CD (Average Bulk Density/Compacted Density) | .58/.93 | .73/.93 |
| Davison Index Jersey Index | 25/1.6 | 13/0.6 |

TABLE XVI

Use of PALMK Slurry to Improve Binding

| Composition | 10.0% Al₂O₃ Sol | 10.0% Al₂O₃ Sol |
|---|---|---|
| | 12.5% CREY | 15.0% PALMK Slurry (ungelled) |
| | 77.5% Kaolin Clay | 12.5% CREY |
| | | 62.5% Kaolin Clay |
| Calcination | 1 hour at 677° C. | 1 hour at 677° C. |
| ABD/CD | .86/.99 | .82/.91 |
| Davison Index | 7/1.0 | 3/0.4 |
| Jersey Index | | |

TABLE XVII

Pilot Unit Comparison with/without PALMK

| Composition | 15% Al₂O₃ Sol | 15% Al₂O₃ Sol |
|---|---|---|
| | 15% US-Y | 40% US-Y |
| | 70% PALMK | 45% Kaolin Clay |
| Deactivation: | 12 hours, 20% steam after 1 hour at 677° C. theraml treatment. | |
| Pilot unit Conditions: | 40 WHSV, 3 C/O, 496° C. on Sohio Heavy Gas Oil. | |
| Vol. % Conversion | 53.5 | 58.0 |
| H₂, wt. % | 0.08 | 0.04 |
| C₁ + C₂, wt. % | 1.16 | .076 |
| Total C₃, vol. % | 6.5 | 5.7 |
| Total C₄, vol. % | 9.6 | 10.1 |
| C₅ + Gasoline, vol. % | 42.0 | 47.0 |
| RON (Research Octane No.) | 92.2 | 92.1 |
| Light Cycle Oil, vol. % | 16.3 | 15.9 |
| 338° C. + Residue, vol. % | 28.2 | 26.1 |
| Coke, wt. % | 4.2 | 4.3 |

TABLE XVIII

Use of PALMK to Enhance Gasoline Octane at Reduced US-Y Usage

| Composition | 23% SiO₂ Sol | 25% SiO₂ Sol |
|---|---|---|
| | 20% US-Y | 30% US-Y |
| | 57% PALMK | 45% Kaolin Clay |
| Hydrothermal Treatment: | 12 hours, 827° C., 20 steam. | |
| Pilot Unit Conditions: | 40 WHSV, 3 C/O., Sohio Feed, 510° C. | |
| Vol. % Conversion | 55.0 | 55.0 |
| Total C₃, vol. % | 6.1 | 5.1 |
| Total C₄, vol. % | 11.0 | 9.8 |
| C₅ + Gasoline, vol. % | 39.5 | 42.0 |
| RON | 90.7 | 89.0 |
| MON | 79.1 | 78.4 |
| LCO, vol. % | 30.2 | 30.8 |
| 338° C. + Residue, vol. % | 14.8 | 14.1 |

EXAMPLE 34

A base/acid reacted kaolin prepared in accordance with the teachings of U.S. Pat. No. 3,406,124 was produced as follows: 116.16 g kaolin clay was slurried in 384.9 g deionized water with rapid agitation. A solution of 5.1 g NaOH in 5.1 g deionized water was added to the clay slurry and then hot aged for 1 hour at 200° F. After cooling to 150° F., 30.3 g 18 wt. % H₂SO₄ was added to pH 5.2. The pH was then adjusted to 7.0 with 2N NaOH. The slurry was filtered, washed three times with ½ 1. hot deionized water and dried overnight at 250° F. The sample was crushed through a 20 mesh screen, then exchanged twice with 0.25 parts (NH₄)₂SO₄/part clay/5 parts water for ½ hour at 150° F., filtered, washed 1X ½ 1 hot deionized water (3 times ½ 1 hot deionized water after the second exchange) and oven dried overnight at 250° F.

The properties are summarized in Table XIX. Compared with PALMK, this material is much lower in surface area, lower in N₂ pore volume, has a much higher average pore diameter and is considerably higher in Al₂O₃ content.

TABLE XIX

Properties of Composition Produced by Method of U.S. Pat. No. 3,406,124

| | |
|---|---|
| Surface Area, m₂/g | 21 |
| N₂ Pv, cc/g | 0.04 |
| Avg. Pore Diameter, Å | 76 |

EXAMPLE 35

An acid reacted clay product was prepared in accordance with the teachings of U.S. Pat. No. 2,485,626 as follows: 10 g of kaolin clay was calcined for 2 hours at 1350° F. The calcined clay was mixed with 222.2 ml of 18 % wt. % H₂SO₄ solution and reacted at room temperature (75° F.) for 48 hours with slow agitation: The resulting reaction mixture was divided into two samples.

Sample 1 was filtered to remove the solid product which was washed twice with 0.5 1 of deionized water and oven dried at 250° F. The resulting product possessed an Al₂O₃ content of 40.52 wt. % and a surface area of 34 m²/g.

Sample 2 was combined with sufficient (14 wt. %) NH₄OH solution to adjust the pH to 9.0, filtered to recover solids which were washed one with 0.5 1 water, adjusted to pH 9 with NH₄OH, and once with 0.5 1 deionized water. The resulting product was oven dried at 250° F. and found to possess an Al₂O₃ content of 43.3 wt. %, and a surface area of 46 m²/g.

The above Examples clearly indicate that valuable catalyst compositions may be obtained using the teachings of my invention.

I claim:

1. An acid reacted metakaolin composition having a mole composition of about 0.8 to 1.0 Al₂O₃ . 2SiO₂ and characterized by a surface area of above about 150 m²/g.

2. The composition of claim 1 further characterized by a total pore volume of about 0.15 cc/g to 0.50 cc/g, an average pore diameter of about 20 to 40 A°, and a surface area of up to about 500 m²/g.

3. The composition of claim 2 further characterized by having above about 90 percent of the surface in pores less than 50 A° in diameter.

4. The composition of claim 1 reacted with a base, and further characterized by a total pore volume of up to about 0.70 cc/g.

5. The composition of claim 1 reacted at a temperature above about 300° C., and further characterized by a surface area of below about 500 m²/g.

6. A method for preparing acid reacted metakaolin comprising:
   (a) heating kaolin at a temperature of about 700° to 910° C. for a period in excess of about one minute to obtain a reactive metakaolin; and
   (b) reacting said reactive metakaolin with an acid selected from the group consisting of hydrochloric and nitric acids, and salts and mixtures thereof in amounts of less than about 1.5 moles of acid per mole of reactive metakaolin.

7. The method of claim 6 wherein from about 0.3 to about 0.9 moles of acid are reacted per mole of reactive metakaolin.

8. The method of claim 6 wherein the acid reacted metakaolin is subsequently reacted with a base.

9. The method of claim 8 wherein said base is ammonium hydroxide.

10. The method of claim 6 wherein said acid reacted metakaolin is subsequently calcined at a temperature of 300° to 900° C.

11. A hydrocarbon conversion catalyst comprising the composition of claim 1, 4 or 5 in particulate form.

12. The catalyst of claim 10 which is formed into fluid particles having a size range of about 20 to 200 microns.

13. A particulate catalytic composition comprising:
   (a) a solid, inorganic oxide, and
   (b) an acid reacted metakaolin binder comprising the composition of claim 1, 4 or 5, or prepared by the method of claim 6 or 7.

14. The composition of claim 13 wherein the solid inorganic oxide component is selected from the group consisting of crystalline zeolites, silica, alumina, silica-alumina, hydrogels and hydrosols, clays and mixtures thereof.

15. The composition of claim 13 wherein said composition comprises a fluid cracking catalyst composition that contains from about 10 to 90 percent by weight of a crystalline zeolite.

16. The composition of claim 15 wherein said zeolite is selected from the group consisting of rare earth exchanged type Y zeolite, ultrastable type Y zeolite and mixtures thereof.

17. The composition of claim 16 wherein said composition includes up to 80 percent by weight raw kaolin.

18. A method for preparing a catalytic composition which comprises:
   (a) mixing the acid reacted metakaolin of claim 1, 4 or 5 with a particulate inorganic solid;
   (b) forming the mixture into catalyst particles; and
   (c) calcining said particles at a temperature of 300° to 800° C.

19. A method for preparing a catalytic composition which comprises:
   (a) mixing the acid reacted metakaolin of claim 4 with a particulate inorganic solid; and
   (b) forming the mixture into catalyst particles.

20. The method of claim 18 or 19 wherein the particulate inorganic solid is selected from the group consisting of crystalline zeolites, silica, alumina, silica-alumina hydrogels, clays and mixtures thereof.

21. The method of claim 18 or 19 wherein up to about 20 parts by weight solid inorganic oxide is mixed per part by weight of acid reacted metakaolin.

22. The method of claim 18 or 19 wherein said mixture is formed by spray drying, extruding, pilling or granulating.

23. The method of claim 18 or 19 wherein the particulate inorganic solid comprises the composition of claim 4 or 5.

24. The method of claim 18 or 19 wherein the acid reacted metakaolin is washed to remove soluble salts.

25. The method of claim 18 or 19 wherein the catalyst particles are washed and/or ion-exchanged.

26. A hydrocarbon conversion catalyst comprising:
   (i) a crystalline aluminosilicate zeolite; and
   (ii) an acid reacted metakaolin prepared by the method comprising:
   (a) heating a kaolin at a temperature of about 700° to 910° C. for a period in excess of about one minute to obrain a reactive metakaolin;
   (b) reacting said reactive metakaolin with an acid selected from the group consisting of hydrochloric and nitric acid, and salts and mixtures thereof in amountsw of less than about 1.5 moles of acid per mole of reactive metakaolin; and
   (c) heating or reacting the reaction mixture of step (b) with sufficient base to precipitate alumina and to obtain a product which possesses a silica to alumina ratio essentially that of the kaolin used in step (a).

27. The composition of claim 26 wherein said zeolite is selected from the group consisting of calcined rare earth exchanged Y, ultrastable Y, ZSM-5 and mixtures thereof.

28. The composition of claim 26 which contains an inorganic oxide binder selected from the group consisting of silica sol and alumina sol.

29. The composition of claim 28 which contains clay.

30. The composition of claim 26 which contains ultrastable Y zeolite.

* * * * *